United States Patent
Kiyota et al.

(10) Patent No.: US 11,791,069 B2
(45) Date of Patent: Oct. 17, 2023

(54) GROMMET AND WIRE HARNESS

(71) Applicant: Yazaki Corporation, Tokyo (JP)

(72) Inventors: Hirotaka Kiyota, Shizuoka (JP);
Masaru Kiuchi, Shizuoka (JP);
Takeshi Onoda, Shizuoka (JP); Junya Kato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 509 days.

(21) Appl. No.: 17/171,991

(22) Filed: Feb. 9, 2021

(65) Prior Publication Data

US 2021/0257133 A1 Aug. 19, 2021

(30) Foreign Application Priority Data

Feb. 17, 2020 (JP) .................................. 2020-024487

(51) Int. Cl.
*H01B 17/58* (2006.01)
*F16L 5/00* (2006.01)

(52) U.S. Cl.
CPC ............ *H01B 17/586* (2013.01); *F16L 5/00* (2013.01)

(58) Field of Classification Search
CPC ....... H01B 17/586; F16L 5/00; B60R 16/0222
See application file for complete search history.

(56) References Cited

U.S. PATENT DOCUMENTS

| 3,053,564 | A | * | 9/1962 | Evans | B60J 5/04 439/31 |
| 3,633,250 | A | * | 1/1972 | Romney | A47F 7/163 403/233 |
| 4,857,672 | A | * | 8/1989 | Rebers | G02B 6/4444 174/92 |
| 4,889,298 | A | * | 12/1989 | Hauff | F16L 5/08 174/503 |
| 5,981,877 | A | * | 11/1999 | Sakata | B60R 16/0222 439/567 |
| 6,152,767 | A | * | 11/2000 | Roosen | H02G 15/013 439/587 |
| D443,811 | S | * | 6/2001 | Tisbo | D8/356 |

(Continued)

FOREIGN PATENT DOCUMENTS

JP 2005-190973 A 7/2005

*Primary Examiner* — William H. Mayo, III
*Assistant Examiner* — Rhadames Alonzo Miller
(74) *Attorney, Agent, or Firm* — KENEALY VAIDYA LLP

(57) ABSTRACT

A grommet includes a fitting body causing a circumferential edge portion of a through hole provided in a wall body to be fitted into a fitting groove provided in an outer wall, and a first cylinder and a second cylinder causing a harness body to be extracted through the cylinder. The fitting body includes a cylindrical portion, a plurality of ribs rising from an outer circumferential wall surface of the cylindrical portion and disposed on the outer circumferential wall surface at equal intervals in a circumferential direction, and a first support portion and a second support portion provided for each of the ribs. The first support portion and the second support portion project from the outer circumferential wall surface to be high enough to suppress elastic deformation of the rib in the circumferential direction toward the outer circumferential wall surface.

9 Claims, 6 Drawing Sheets

(56) References Cited

U.S. PATENT DOCUMENTS

| | | | |
|---|---|---|---|
| 6,278,060 B1* | 8/2001 | Mori | H02G 3/0475 174/152 G |
| 6,497,414 B1* | 12/2002 | Roosen | H02G 15/013 277/316 |
| 6,660,937 B1* | 12/2003 | MacLeod | H02G 3/22 174/152 G |
| D559,660 S* | 1/2008 | DeCosta | D8/356 |
| 8,347,906 B1* | 1/2013 | Ismert | E04G 15/061 4/293 |
| 8,791,376 B2* | 7/2014 | Endt | H02G 3/22 174/650 |
| 8,969,741 B2* | 3/2015 | Aldrich | H02G 3/083 174/653 |
| 9,109,357 B2* | 8/2015 | Moreno | E04B 1/98 |
| D754,078 S* | 4/2016 | Baldwin | D13/156 |
| 10,573,436 B2* | 2/2020 | Coyle | H01B 17/586 |
| 10,969,037 B2* | 4/2021 | Vaughn | F16L 5/00 |
| D924,813 S* | 7/2021 | Bailey | D13/155 |
| 2001/0008330 A1* | 7/2001 | Sakata | B60R 16/0222 277/316 |
| 2002/0038492 A1* | 4/2002 | Hashimoto | H02G 3/083 16/2.1 |
| 2002/0129958 A1* | 9/2002 | Petri | H02G 3/088 174/546 |
| 2003/0010566 A1* | 1/2003 | Miyakawa | F02M 35/10301 181/204 |
| 2003/0014924 A1* | 1/2003 | Nakamura | B60R 13/0846 52/1 |
| 2003/0015339 A1* | 1/2003 | Sato | H02G 3/22 174/668 |
| 2003/0079897 A1* | 5/2003 | Sempliner | H02G 3/185 174/650 |
| 2004/0140118 A1* | 7/2004 | Nishimoto | B60R 16/0222 174/650 |
| 2004/0154819 A1* | 8/2004 | Sakata | B60R 16/0222 174/650 |
| 2005/0076469 A1* | 4/2005 | Tisbo | H02G 3/083 16/2.1 |
| 2005/0140075 A1* | 6/2005 | Mishima | F02B 77/13 267/140.11 |
| 2006/0185875 A1* | 8/2006 | Habel | H02G 3/22 174/50 |
| 2007/0246613 A1* | 10/2007 | Kennedy | H02G 3/32 248/56 |
| 2008/0017401 A1* | 1/2008 | Uchida | H02G 3/22 174/153 G |
| 2008/0220659 A1* | 9/2008 | Ikeya | H01R 13/5213 439/701 |
| 2009/0000861 A1* | 1/2009 | Hikami | F01N 13/102 181/200 |
| 2009/0028659 A1* | 1/2009 | Shibuya | F16B 21/073 411/57.1 |
| 2009/0056230 A1* | 3/2009 | Flendrig | B60R 16/0215 49/502 |
| 2009/0065235 A1* | 3/2009 | Uchibori | B60R 16/0222 174/152 G |
| 2010/0176533 A1* | 7/2010 | Hayashi | B29C 45/14418 264/252 |
| 2010/0307817 A1* | 12/2010 | Roy | H02G 3/185 174/666 |
| 2010/0314158 A1* | 12/2010 | Suzuki | H02G 3/22 174/152 G |
| 2011/0073350 A1* | 3/2011 | Okuhara | B60R 16/0222 174/152 G |
| 2011/0247172 A1* | 10/2011 | Yoshii | B60R 13/0206 16/2.1 |
| 2012/0193140 A1* | 8/2012 | Briere | H02G 3/22 174/650 |
| 2012/0211262 A1* | 8/2012 | Agusa | F16J 15/064 174/152 G |
| 2012/0217041 A1* | 8/2012 | Agusa | H02G 3/22 174/153 G |
| 2012/0223489 A1* | 9/2012 | Curtin | H02G 3/185 277/627 |
| 2012/0252272 A1* | 10/2012 | Omae | H01R 13/506 439/607.01 |
| 2013/0008693 A1* | 1/2013 | Okuhara | F16L 5/10 174/152 G |
| 2013/0199823 A1* | 8/2013 | Kanai (Popovici) | B60R 16/0222 174/152 G |
| 2013/0307225 A1* | 11/2013 | Boyd | H02G 3/185 277/626 |
| 2014/0060947 A1* | 3/2014 | Braun | B60R 13/0838 16/2.2 |
| 2014/0231133 A1* | 8/2014 | Fritz | G21C 17/116 174/650 |
| 2015/0041210 A1* | 2/2015 | Inao | B60R 16/0215 174/72 A |
| 2015/0285408 A1* | 10/2015 | Cox | F16L 5/14 277/628 |
| 2016/0134090 A1* | 5/2016 | Kushima | H05K 9/0098 174/362 |
| 2017/0179703 A1* | 6/2017 | Kominato | H01B 7/0045 |
| 2017/0219100 A1* | 8/2017 | Kobayashi | F16J 15/3204 |
| 2017/0234434 A1* | 8/2017 | Shuto | F16J 3/04 277/504 |
| 2017/0349123 A1* | 12/2017 | Katoh | H01B 17/583 |
| 2018/0128400 A1* | 5/2018 | Twelves | H02G 15/013 |
| 2018/0145430 A1* | 5/2018 | Yanai | H01R 4/70 |
| 2018/0342830 A1* | 11/2018 | Mizuno | H01R 13/5205 |
| 2019/0089142 A1* | 3/2019 | Sugino | H02G 3/34 |
| 2021/0328416 A1* | 10/2021 | Ehmann | F16L 5/10 |

* cited by examiner

GROMMET AND WIRE HARNESS

CROSS-REFERENCE TO RELATED APPLICATION(S)

The present application claims priority to and incorporates by reference the entire contents of Japanese Patent Application No. 2020-024487 filed in Japan on Feb. 17, 2020.

BACKGROUND OF THE INVENTION

1. Field of the Invention

The present invention relates to a grommet and a wire harness.

2. Description of the Related Art

A wire harness is conventionally provided with an electric wire penetrating a circular through hole in a wall body (e.g. a vehicle body panel of a vehicle) to route the electric wire in both spaces partitioned by the wall body. The wall body is accordingly provided with a grommet closing a gap between the through hole and the electric wire for protection of the electric wire from a circumferential edge portion of the through hole as well as prevention of liquid entry to the gap. The grommet exemplarily includes a fitting body configured to fit the circumferential edge portion of the through hole into an annular fitting groove and route the electric wire in the fitting body along a hole axis of the through hole, a first cylinder having a cylindrical shape, projecting from a first axial end of the fitting body, and extracting the electric wire in the fitting body through the cylinder, and a second cylinder having a cylindrical shape, projecting from a second axial end of the fitting body, and extracting the electric wire in the fitting body through the cylinder. In the grommet, one of the cylinders is pulled along a cylinder axis, the fitting body caught by the circumferential edge portion of the through hole being deformed and sliding guides the circumferential edge portion to be fitted into the fitting groove. Such a grommet of this type is disclosed in Japanese Patent Application Laid-open No. 2005-190973 and the like. In order for decrease in insertion force for assembly of the fitting body to the through hole in the wall body, the grommet according to Japanese Patent Application Laid-open No. 2005-190973 provides a plurality of ribs rising at equal intervals on a surface of the fitting body along an entire circumference and thus achieves reduction in frictional resistance upon sliding. Each of the ribs is in contact with the circumferential edge portion of the through hole until guided into the fitting groove, for reduction in contact area between the circumferential edge portion of the through hole and the fitting body being sliding.

A wire harness needs to enable further reduction in force of inserting the fitting body to the through hole in the wall body, for improvement in assembling workability. Meanwhile, a grommet needs to keep an assembled state after being assembled to the through hole in the wall body.

SUMMARY OF THE INVENTION

In view of these, it is an object of the present invention to provide a grommet and a wire harness that can reduce insertion force as well as can keep an assembled state.

In order to achieve the above mentioned object, a grommet according to one aspect of the present invention includes a fitting body causing a circumferential edge portion of a through hole having a circular shape and provided in a wall body to be fitted into a fitting groove having an annular shape and provided in an outer wall, and causing a harness body routed along a hole axis of the through hole in a space in the outer wall to be extracted from the space through a first draw-out aperture having a circular shape and disposed at a first axial end and a second draw-out aperture having a circular shape and disposed at a second axial end; a first cylinder having a cylinder axis coaxial with an axis of the fitting body, projecting outward from a circumferential edge portion of the first draw-out aperture, and causing the harness body in the space to be extracted through inside of the first cylinder; and a second cylinder having a cylinder axis coaxial with the axis of the fitting body, projecting outward from a circumferential edge portion of the second draw-out aperture, and causing the harness body in the space to be extracted through inside of the second cylinder, wherein the fitting body includes a cylindrical portion having an outer circumferential wall surface joined to the fitting groove at a position closer to the first cylinder than the fitting groove in the outer wall, and gradually reduced in diameter as being away coaxially from the fitting groove, a plurality of ribs rising from the outer circumferential wall surface of the cylindrical portion and disposed on the outer circumferential wall surface at equal intervals in a circumferential direction, and each extending on the outer circumferential wall surface at least from a position equal in diameter to the circumferential edge portion of the through hole to a radially outer end, a first support portion provided for each of the ribs and supporting a side, adjacent to the outer circumferential wall surface, of a first side wall of the rib on a first side in the circumferential direction, and a second support portion provided for each of the ribs and supporting a side, adjacent to the outer circumferential wall surface, of a second side wall of the rib on a second side in the circumferential direction, the rib is shaped to enable elastic deformation in the circumferential direction, and the first support portion and the second support portion project from the outer circumferential wall surface to be high enough to suppress elastic deformation of the rib in the circumferential direction toward the outer circumferential wall surface.

According to another aspect of the present invention, in the grommet, it is possible to configure that the rib is shaped to enable inclining deformation in the circumferential direction within an elastic region, and the first support portion and the second support portion project from the outer circumferential wall surface to be high enough to suppress at least inclining deformation of the rib in the circumferential direction toward the outer circumferential wall surface.

According to still another aspect of the present invention, in the grommet, it is possible to configure that the first support portion projects to the first side in the circumferential direction from the side, adjacent to the outer circumferential wall surface, of the first side wall, and the second support portion projects to the second side in the circumferential direction from the side, adjacent to the outer circumferential wall surface, of the second side wall.

According to still another aspect of the present invention, in the grommet, it is possible to configure that the fitting body includes a locked portion that is disposed radially inside the ribs, rises from the outer circumferential wall surface for each of the ribs, is configured to be locked to an outer circumferential surface of the first cylinder when the first cylinder is shifted relatively to the fitting body along the cylinder axis toward the second cylinder, to suppress elastic deformation of the cylindrical portion or reduce elastic deformation.

In order to achieve the above mentioned object, a wire harness according to still another aspect of the present invention includes a harness body; and a grommet protecting the harness body, wherein the grommet including: a fitting body causing a circumferential edge portion of a through hole having a circular shape and provided in a wall body to be fitted into a fitting groove having an annular shape and provided in an outer wall, and causing the harness body routed along a hole axis of the through hole in a space in the outer wall to be extracted from the space through a first draw-out aperture having a circular shape and disposed at a first axial end and a second draw-out aperture having a circular shape and disposed at a second axial end; a first cylinder having a cylinder axis coaxial with an axis of the fitting body, projecting outward from a circumferential edge portion of the first draw-out aperture, and causing the harness body in the space to be extracted through inside of the first cylinder; and a second cylinder having a cylinder axis coaxial with the axis of the fitting body, projecting outward from a circumferential edge portion of the second draw-out aperture, and causing the harness body in the space to be extracted through inside of the second cylinder, wherein the fitting body includes a cylindrical portion having an outer circumferential wall surface joined to the fitting groove at a position closer to the first cylinder than the fitting groove in the outer wall, and gradually reduced in diameter as being away coaxially from the fitting groove, a plurality of ribs rising from the outer circumferential wall surface of the cylindrical portion and disposed on the outer circumferential wall surface at equal intervals in a circumferential direction, and each extending on the outer circumferential wall surface at least from a position equal in diameter to the circumferential edge portion of the through hole to a radially outer end, a first support portion provided for each of the ribs and supporting a side, adjacent to the outer circumferential wall surface, of a first side wall of the rib on a first side in the circumferential direction, and a second support portion provided for each of the ribs and supporting a side, adjacent to the outer circumferential wall surface, of a second side wall of the rib on a second side in the circumferential direction, the rib is shaped to enable elastic deformation in the circumferential direction, and the first support portion and the second support portion project from the outer circumferential wall surface to be high enough to suppress elastic deformation of the rib in the circumferential direction toward the outer circumferential wall surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A grommet and a wire harness according to an embodiment of the present invention will hereinafter be described in detail with reference to the drawings. This invention is not to be limited by the embodiment.

Embodiment

A grommet and a wire harness according to an embodiment of the present invention will be described with reference to FIG. 1 to FIG. 6.

Figure 1:
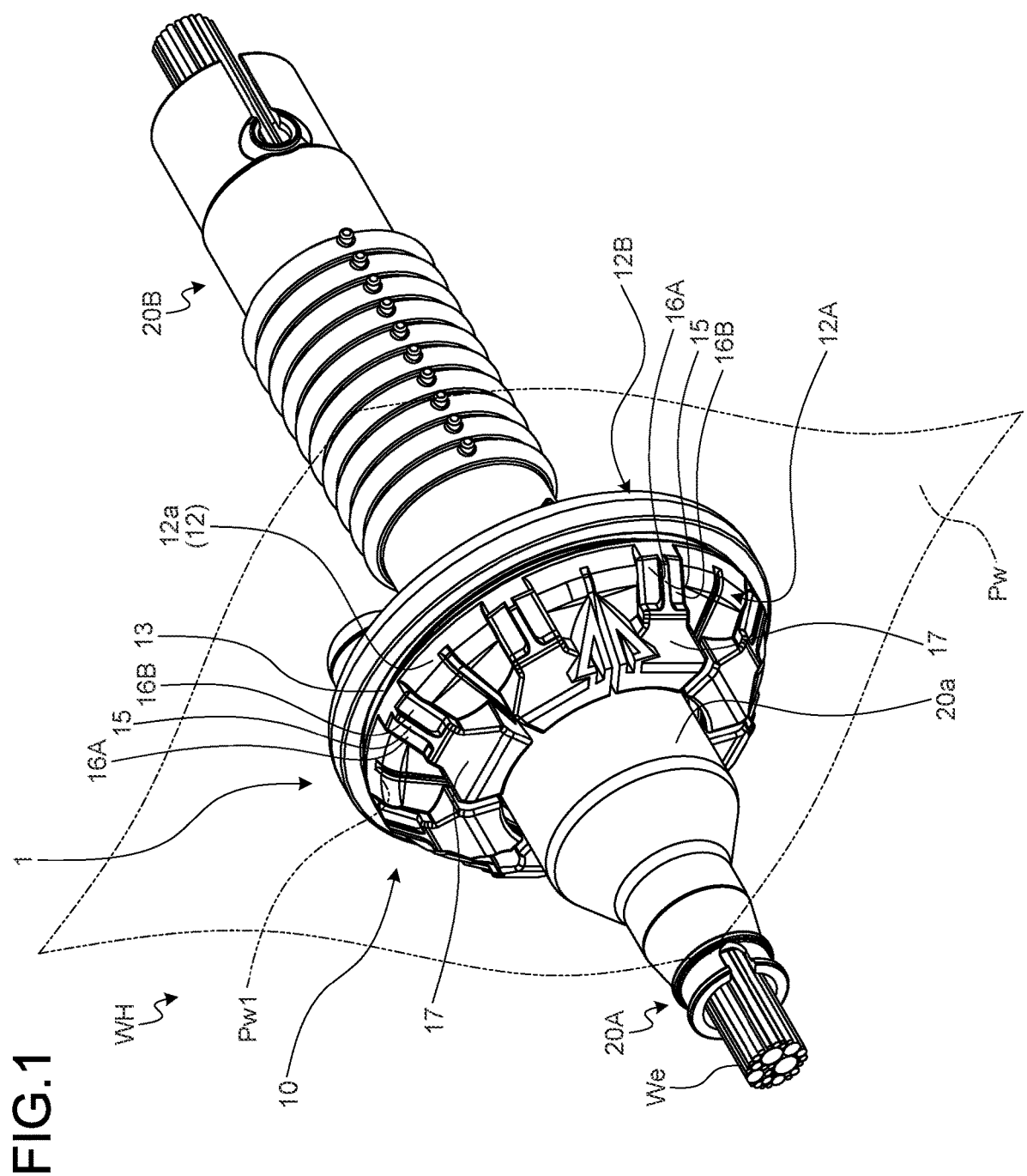
FIG. 1 is a perspective view of a grommet and a wire harness according to an embodiment.

FIG. 1 to FIG. 5 include reference sign 1 denoting a grommet according to the present embodiment. The grommet 1 protects a harness body We inserted through a circular through hole Pw1 provided in a wall body Pw. The harness body We includes a single or a plurality of bundled electric wires functioning as communication lines or power supply lines. When the harness body We includes the plurality of electric wires, the plurality of electric wires is collected together by an exterior component such as a corrugate tube or a resin tape. Examples of the wall body Pw for a vehicle includes a vehicle body panel. The harness body We is inserted through the through hole Pw1 in the wall body Pw so as to be routed in two spaces (e.g. an engine compartment and a cabin) partitioned by the wall body Pw. The harness body We is used for communication between devices in these spaces, power supply from a power source in a first one of the spaces to an electric device in a second one of the spaces, and the like. The grommet 1 is attached to the wall body Pw so as to protect the harness body We from a circumferential edge portion of the through hole Pw1 in the wall body Pw and prevent liquid (e.g. water) from entering a gap between the through hole Pw1 and the harness body We. Herein, the grommet 1 and the harness body We assembled together will be referred to as a wire harness WH (FIG. 1).

The grommet 1 is made of an elastic material such as an elastomer. The grommet 1 integrally includes a fitting body 10, a first cylinder 20A, and a second cylinder 20B to be described below. In the grommet 1, the fitting body 10 has a first axial end coupled coaxially to the first cylinder 20A, and a second axial end coupled coaxially to the second cylinder 20B.

Figure 2:
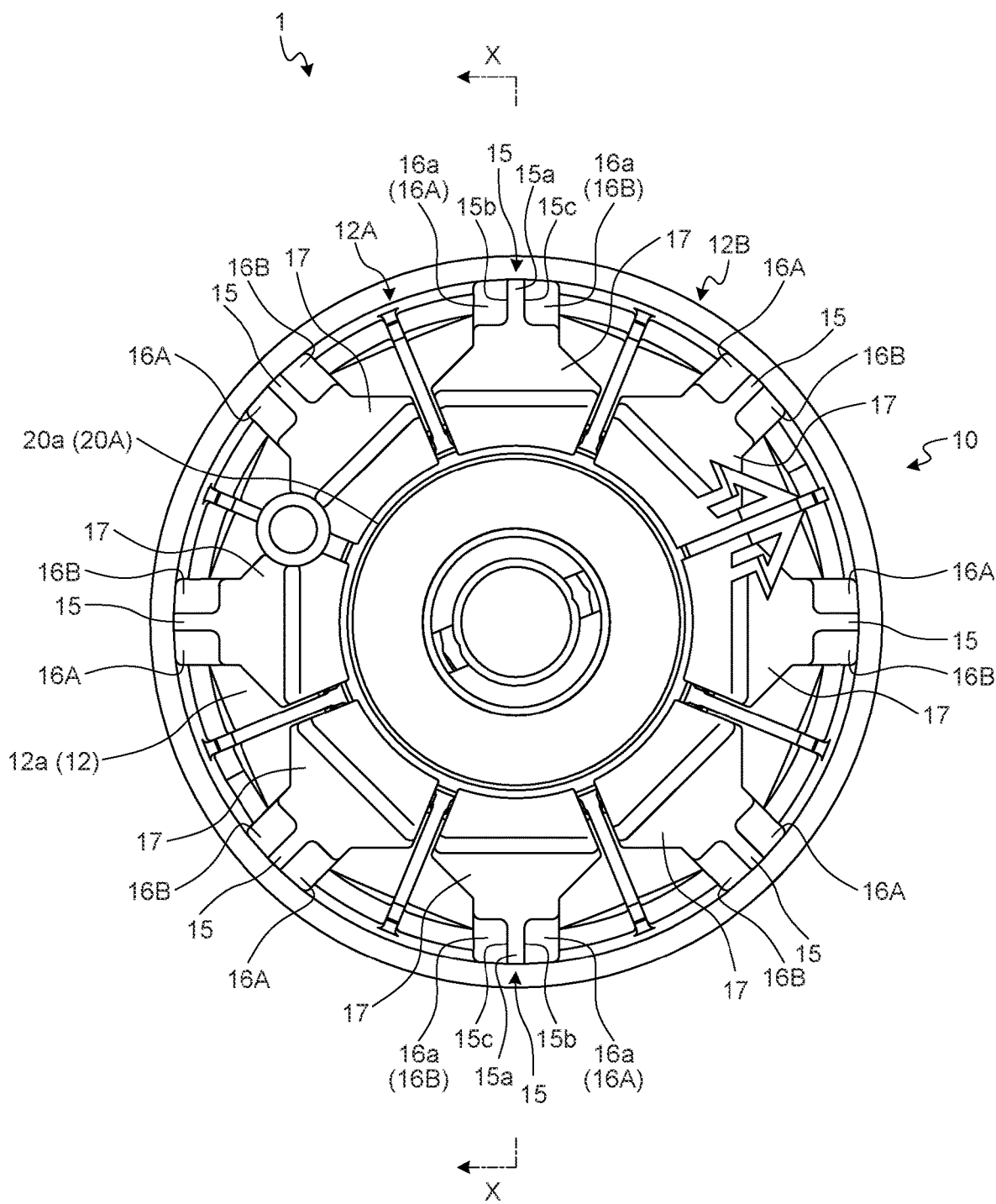
FIG. 2 is a plan view of the grommet in an axial direction.
Figure 3:
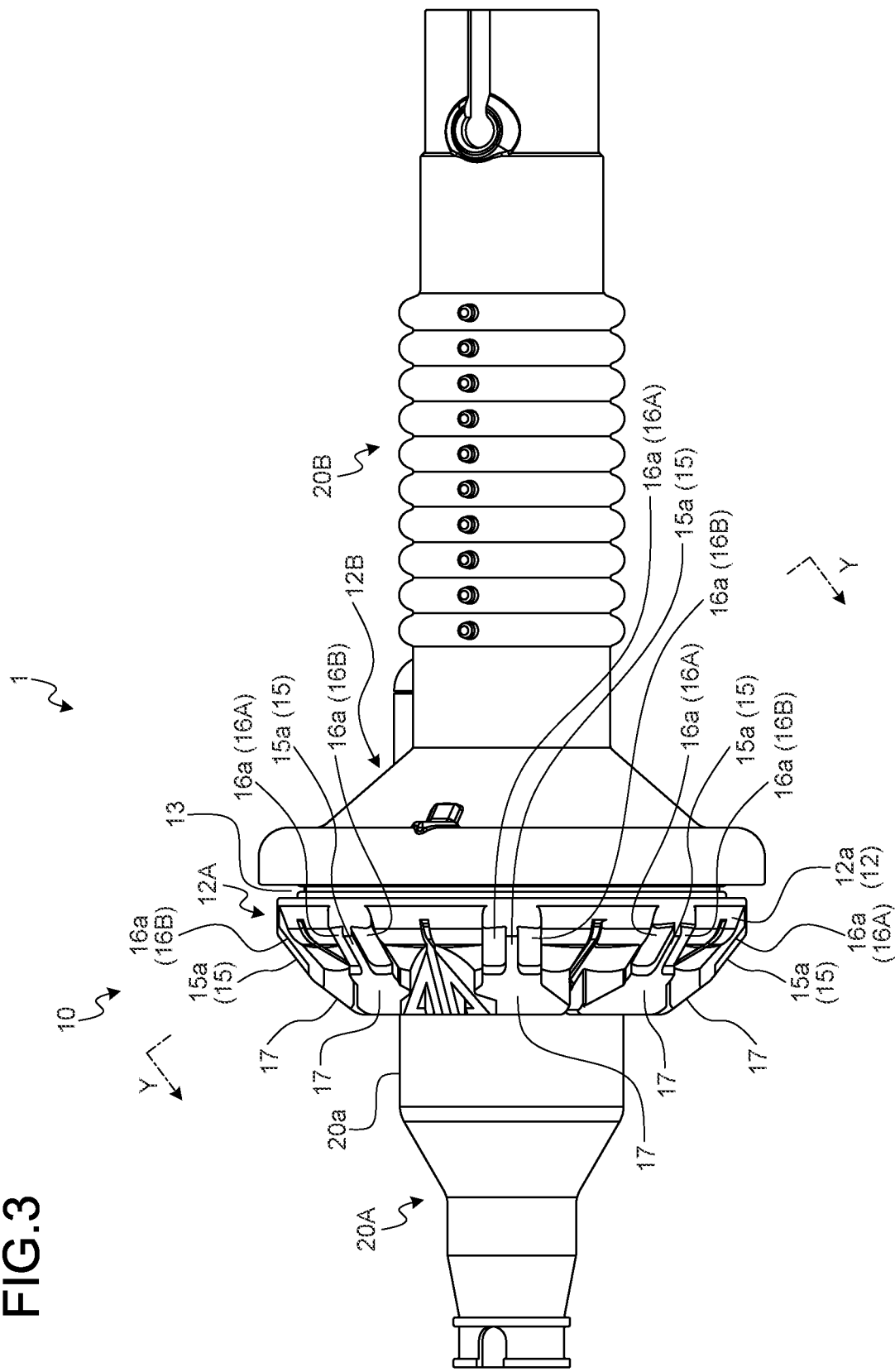
FIG. 3 is a plan view of the grommet in a direction perpendicular to the axial direction.
Figure 4:
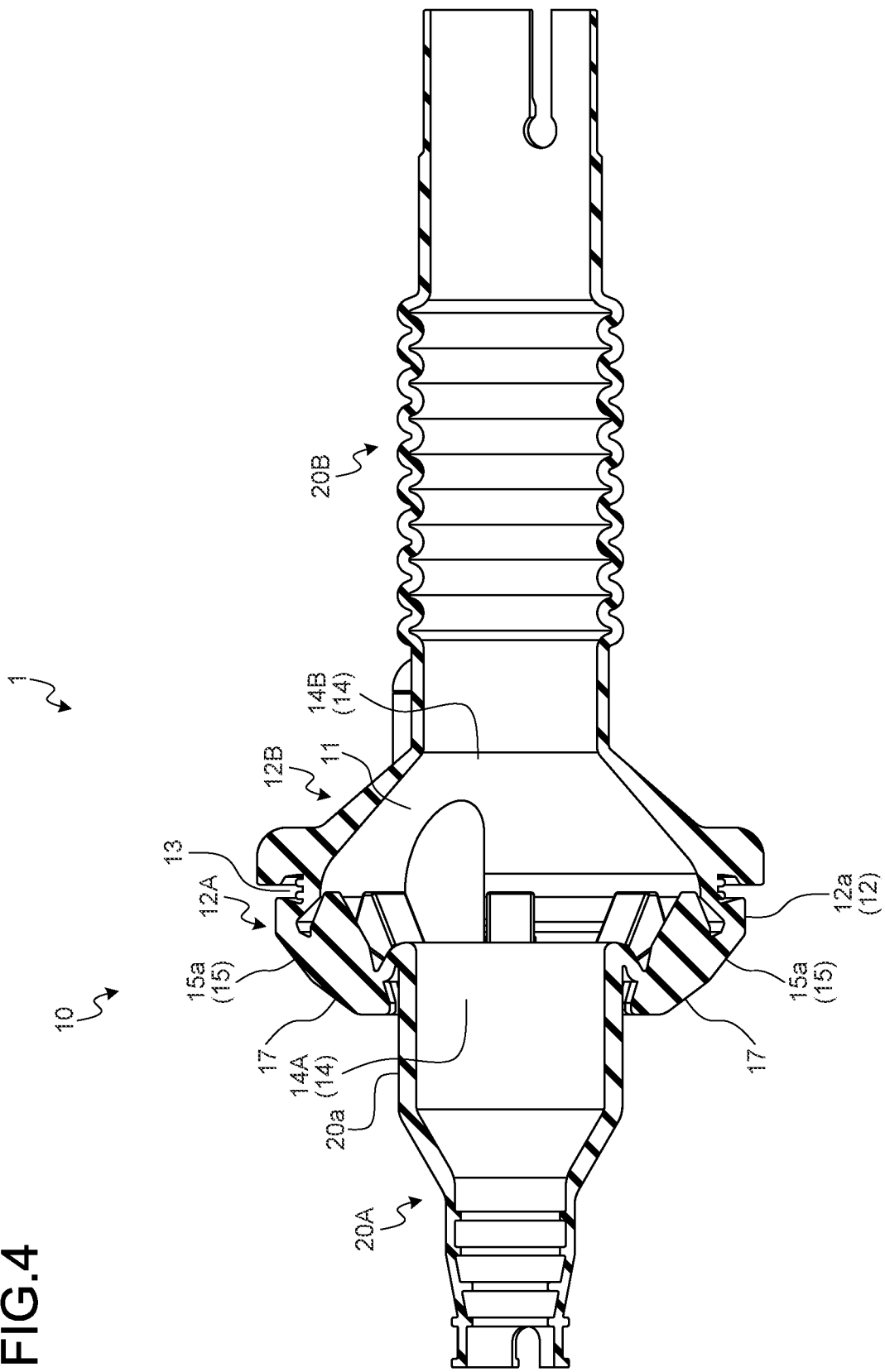
FIG. 4 is a sectional view taken along line X-X indicated in FIG. 2.

The grommet 1 includes the fitting body 10 fitted to the circumferential edge portion of the through hole Pw1 (FIG. 1 to FIG. 4). The fitting body 10 is constituted by an outer wall 12 having an interior serving as a space 11 (FIG. 4). The outer wall 12 has a gradually changing cylindrical portion (hereinafter, referred to as a "first cylindrical portion") 12A having a gradually reducing diameter along a cylinder axis toward the first cylinder 20A, and a gradually changing cylindrical portion (hereinafter, referred to as a "second cylindrical portion") 12B having a gradually reducing diameter along a cylinder axis toward the second cylinder 20B. The outer wall 12 exemplified herein is shaped to include the first cylindrical portion 12A having a truncated cone shape and the second cylindrical portion 12B having a truncated cone shape combined coaxially with each other. In this outer wall 12, the first cylindrical portion 12A and the second cylindrical portion 12B have bottoms equal in diameter and coupled coaxially to each other, and tops disposed at respective axial ends. In the grommet 1, the first cylinder 20A is coupled to the top of the first cylindrical portion 12A, and the second cylinder 20B is coupled to the top of the second cylindrical portion 12B.

The outer wall 12 has an outer circumferential wall surface 12a provided coaxially with an annular fitting groove 13 receiving the circumferential edge portion of the through hole Pw1 in the wall body Pw (FIG. 1, FIG. 3, and FIG. 4). The fitting groove 13 is provided at the coupled bottoms of the first cylindrical portion 12A and the second cylindrical portion 12B, or adjacent to the bottom of one of the first cylindrical portion 12A and the second cylindrical portion 12B. The fitting body 10 exemplified herein has the fitting groove 13 provided at the coupled bottoms of the first cylindrical portion 12A and the second cylindrical portion 12B. The first cylindrical portion 12A has the outer circumferential wall surface 12a joined to the fitting groove 13 at a position closer to the first cylinder 20A than the fitting groove 13 in the outer wall 12, and has a gradually changing cylindrical shape with the gradually reduced diameter as being away coaxially from the fitting groove 13. The second cylindrical portion 12B has the outer circumferential wall surface 12a joined to the fitting groove 13 at a position closer to the second cylinder 20B than the fitting groove 13 in the outer wall 12, and has a gradually changing cylindrical shape with the gradually reduced diameter as being away coaxially from the fitting groove 13.

The space 11 in the outer wall 12 accommodates the harness body We routed along a hole axis of the through hole Pw1. The fitting body 10 causes the harness body We to be extracted from the space 11 through a first draw-out aperture 14A (FIG. 4) at the first axial end and a second draw-out aperture 14B (FIG. 4) at the second axial end. The tops of the first cylindrical portion 12A and the second cylindrical portion 12B are opened in the outer wall 12. In the outer wall 12, the first draw-out aperture 14A is constituted by a circular opening provided in the top of the first cylindrical portion 12A, and the second draw-out aperture 14B is constituted by a circular opening provided in the top of the second cylindrical portion 12B.

Furthermore, the grommet 1 includes the first cylinder 20A having the cylinder axis coaxial with an axis of the fitting body 10, projecting outward from a circumferential edge portion of the first draw-out aperture 14A, and causing the harness body We in the space 11 to be extracted through the cylinder, and the second cylinder 20B having the cylinder axis coaxially with the axis of the fitting body 10, projecting outward from a circumferential edge portion of the second draw-out aperture 14B, and causing the harness body We in the space 11 to be extracted through the cylinder (FIG. 1, FIG. 3, and FIG. 4). The first cylinder 20A has a cantilever shape with a fixed end adjacent to the first draw-out aperture 14A and a free end projecting along the cylinder axis. The second cylinder 20B has a cantilever shape with a fixed end adjacent to the second draw-out aperture 14B and a free end projecting along the cylinder axis.

The grommet 1 assembled to the harness body We is inserted, from the free end of the first cylinder 20A, to the through hole Pw1 in the wall body Pw. In the grommet 1, the first cylinder 20A is pulled along the cylinder axis to elastically deform the fitting body 10 caught by the circumferential edge portion of the through hole Pw1 in the wall body Pw as well as guide the circumferential edge portion to fit the circumferential edge portion into the fitting groove 13. The grommet 1 thus has frictional resistance due to sliding generated between the fitting body 10 and the circumferential edge portion of the through hole Pw1 in the wall body Pw. As the frictional resistance is larger, the fitting body 10 needs to be assembled to the through hole Pw1 in the wall body Pw with larger insertion force (force of pulling the first cylinder 20A).

In view of this, the grommet 1 according to the present embodiment includes ribs 15 provided at the fitting body 10 for reduction in frictional resistance (FIG. 1 to FIG. 5).

The ribs 15 have a plural number, rise from the outer circumferential wall surface 12a of the first cylindrical portion 12A to be disposed at equal intervals in a circumferential direction, and each extend at least from a position equal in diameter to the circumferential edge portion of the through hole Pw1 in the wall body Pw in the outer circumferential wall surface 12a to a radially outer end. The ribs 15 each include a rising end surface 15a (FIG. 2 to FIG. 5) that comes into come into contact with the circumferential edge portion of the through hole Pw1 in the wall body Pw when the first cylinder 20A inserted to the through hole Pw1 in the wall body Pw is pulled along the cylinder axis. When the fitting body 10 in the grommet 1 is assembled to the through hole Pw1 in the wall body Pw, the plurality of ribs 15 comes into contact with the circumferential edge portion of the through hole Pw1 in the wall body Pw as well as slides, to achieve reduction in contact area with the circumferential edge portion for smaller frictional resistance and reduced insertion force to the through hole Pw1 in the wall body Pw, in comparison to a case where the outer circumferential wall surface 12a of the first cylindrical portion 12A comes into contact with the circumferential edge portion of the through hole Pw1 in the wall body Pw as well as slides.

The ribs 15 are shaped to be elastically deformable in the circumferential direction (along each of the ribs 15 being arrayed). Such elastic deformation in the circumferential direction indicates circumferential deformation within an elastic region of each of the ribs 15 when the rising end surface 15a receives force along the cylinder axis. The ribs 15 are formed to have circumferential width (in other words, small width) enabling elastic deformation in the circumferential direction with force applied along the cylinder axis to the end surface 15a. In the grommet 1, the plurality of ribs 15 having such small width enables reduction in contact area with the circumferential edge portion of the through hole Pw1 in the wall body Pw, reduction in frictional resistance, and reduction in insertion force to the through hole Pw1 in the wall body Pw.

Figure 6:
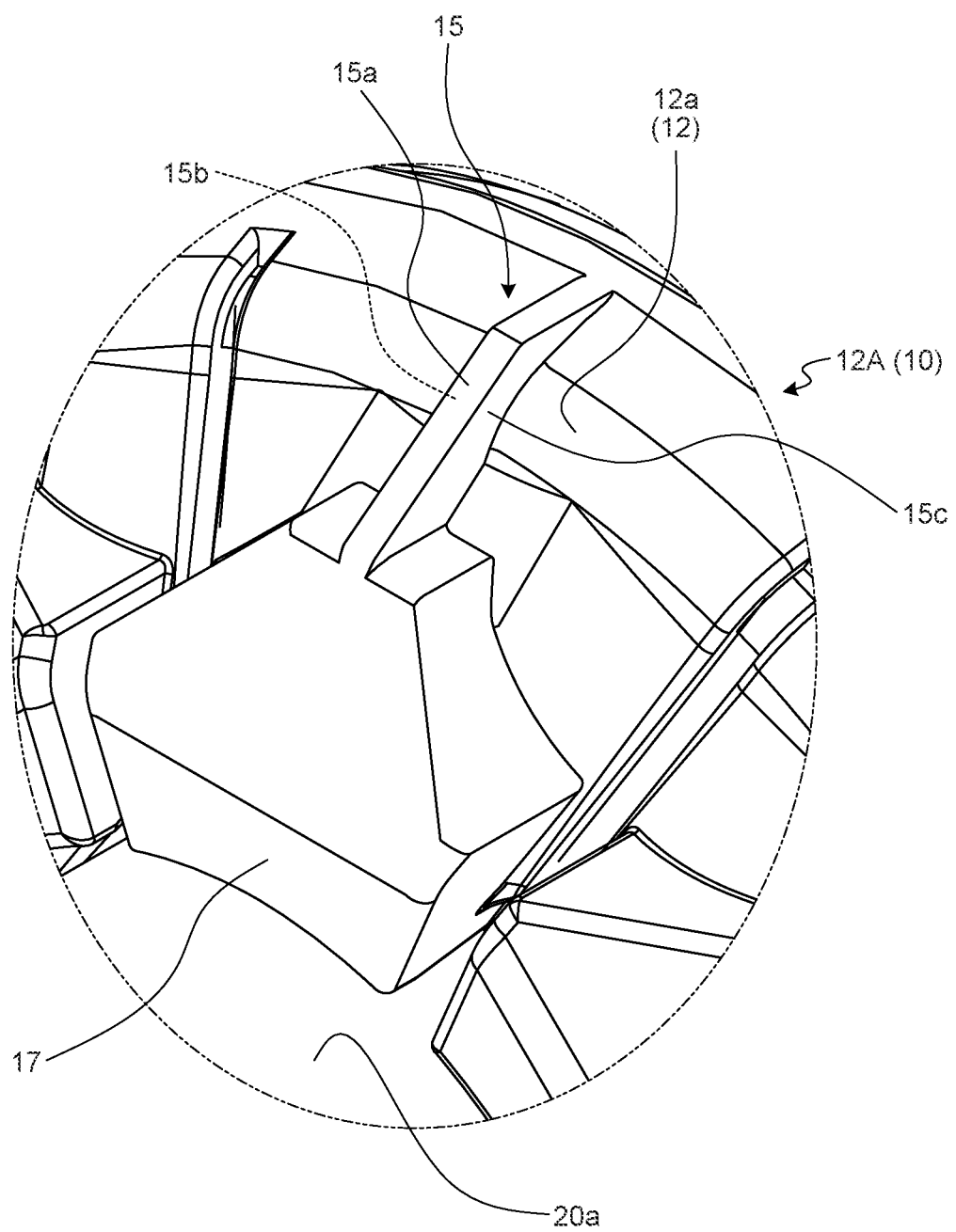
FIG. 6 is a perspective view of the grommet for illustration of a rib.

Specifically, the ribs 15 are shaped to enable inclining deformation in the circumferential direction within the elastic region (FIG. 6). In other words, the ribs 15 are each formed to have small circumferential width so as to enable inclining deformation in the circumferential direction (e.g. bending at a route adjacent to the outer circumferential wall surface 12a, or bending at a position between the route and the end surface 15a) within the elastic region with force along the cylinder axis applied to the rising end surface 15a. The ribs 15 small in width may be compressed within the elastic region by the circumferential edge portion or may be pressed by the circumferential edge portion to have inclining deformation in the circumferential direction within the elastic region when the rising end surface 15a receives force along the cylinder axis from the circumferential edge portion of the through hole Pw1 in the wall body Pw. Each of the ribs 15 may thus be increased in contact area with the circumferential edge portion in comparison to a case where the rising end surface 15a and the circumferential edge portion of the through hole Pw1 in the wall body Pw are in contact with each other. Accordingly, the ribs 15 small in width do not contribute to rigidity improvement of the first cylindrical portion 12A. Specifically, the ribs 15 do not effectively suppress elastic deformation of the fitting body 10 having been assembled to the through hole Pw1 in the wall body Pw.

In view of this, the fitting body 10 in the grommet 1 according to the present embodiment is provided with a first support portion 16A and a second support portion 16B for sufficiently effective reduction in insertion force by each of the ribs 15 as well as effective suppression of elastic deformation or effective reduction in elastic deformation of the fitting body 10 having been assembled (FIG. 1 to FIG. 5). The first support portion 16A and the second support portion 16B are provided to each of the ribs 15.

Figure 5:
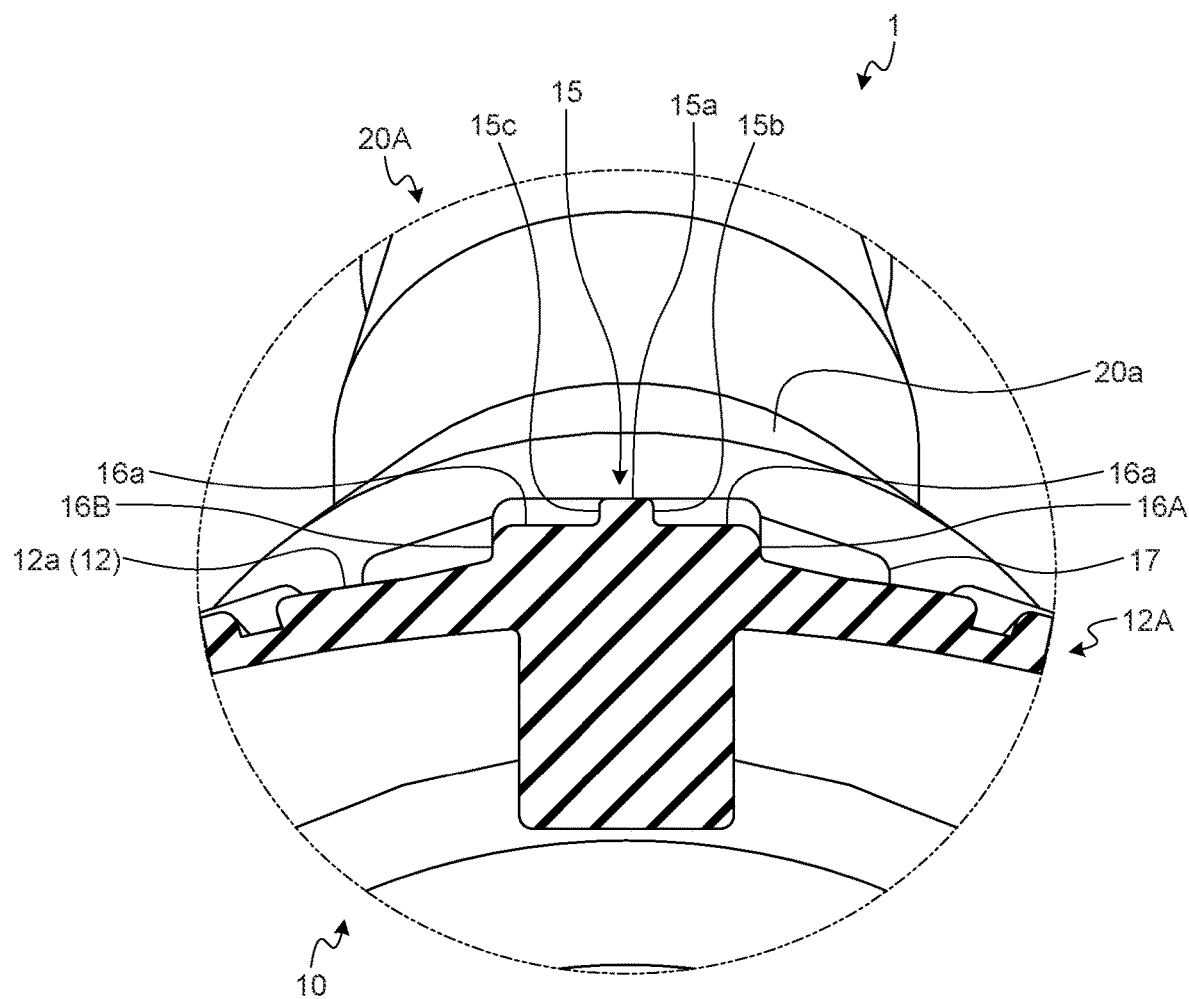
FIG. 5 is a partial enlarged sectional view taken along line Y-Y indicated in FIG. 3.

The first support portion 16A supports a side, adjacent to the outer circumferential wall surface 12a, of a first side wall 15b on a first side in the circumferential direction of the rib 15, and projects from the outer circumferential wall surface 12a to be high enough to suppress elastic deformation of the rib 15 in the circumferential direction toward the outer circumferential wall surface 12a (FIG. 2 and FIG. 5). Specifically, the first support portion 16A projects from the outer circumferential wall surface 12a to be high enough to suppress at least inclining deformation of the rib 15 in the circumferential direction toward the outer circumferential wall surface 12a. The first support portion 16A projects to the first side in the circumferential direction also from the side, adjacent to the outer circumferential wall surface 12a, of the first side wall 15b, and is provided integrally with the rib 15. The first support portion 16A further projects to the first side in the circumferential direction as the first cylindrical portion 12A has a larger rigidity improvement margin. The first support portion 16A exemplified herein has a cubic shape extending at least from the position equal in diameter to the circumferential edge portion of the through hole Pw1 in the wall body Pw in the outer circumferential wall surface 12a to the radially outer end and projecting to the first side in the circumferential direction from the side, adjacent to the outer circumferential wall surface 12a, of the first side wall 15b.

The second support portion 16B supports a side, adjacent to the outer circumferential wall surface 12a, of a second side wall 15c on a second side in the circumferential direction of the rib 15, and projects from the outer circumferential wall surface 12a to be high enough to suppress elastic deformation of the rib 15 in the circumferential direction toward the outer circumferential wall surface 12a (FIG. 2 and FIG. 5). Specifically, the second support portion 16B projects from the outer circumferential wall surface 12a to be high enough to suppress at least inclining deformation of the rib 15 in the circumferential direction toward the outer circumferential wall surface 12a. The second support portion 16B projects to the second side in the circumferential direction also from the side, adjacent to the outer circumferential wall surface 12a, of the second side wall 15c, and is provided integrally with the rib 15. The second support portion 16B further projects to the second side in the circumferential direction as the first cylindrical portion 12A has a larger rigidity improvement margin. The second support portion 16B exemplified herein has a cubic shape extending at least from the position equal in diameter to the circumferential edge portion of the through hole Pw1 in the wall body Pw in the outer circumferential wall surface 12a to the radially outer end and projecting to the second side in the circumferential direction from the side, adjacent to the outer circumferential wall surface 12a, of the second side wall 15c.

In the grommet 1, the first cylindrical portion 12A of the fitting body 10 is provided with the ribs 15 each having the small width at the rising end surface 15a as described above, and the first cylindrical portion 12A is provided with the first support portion 16A and the second support portion 16B supporting the sides, adjacent to an outer circumferential wall surface 12a, of the first side wall 15b and the second side wall 15c of the rib 15 to prevent elastic deformation in the circumferential direction. The first cylindrical portion 12A accordingly has suppressed bending deformation within the elastic region or reduction in bending deformation at positions of the first support portion 16A and the second support portion 16B, for rigidity improvement at a radially outer portion. The fitting body 10 having been assembled to the through hole Pw1 in the wall body Pw is thus suppressed from elastic deformation or reduced in elastic deformation at the radially outer portion of the first cylindrical portion 12A. In the grommet 1, the fitting groove 13 is provided at the radially outer portion of the fitting body 10. Due to effective suppression of elastic deformation at the radially outer portion of the first cylindrical portion 12A or the like, the circumferential edge portion of the through hole Pw1 in the wall body Pw can be kept fitted in the fitting groove 13 and the fitting body 10 can keep the assembled state to the through hole Pw1.

In the rib 15 integrally provided with the first support portion 16A and the second support portion 16B, the rising end surface 15a of the rib 15 projects from projecting end surfaces 16a and 16a of the first support portion 16A and the second support portion 16B from the outer circumferential wall surface 12a (FIG. 3 and FIG. 5). The first support portion 16A and the second support portion 16B are higher than the outer circumferential wall surface 12a so as to allow elastic deformation in the circumferential direction of a projecting portion of the rib 15 from the end surfaces 16a and 16a when the rising end surface 15a receives force along the cylinder axis. Examples of such elastic deformation in the circumferential direction of the projecting portion of the rib 15 include inclining deformation in the circumferential direction within the elastic region when the rising end surface 15a receives force along the cylinder axis, and deformation like shear deformation of circumferential displacement from the end surface 15a within the elastic region when force along the cylinder axis is applied. The projecting portion of the rib 15 is exemplarily shaped to satisfy "½≤W/H≤1" as a relation between projecting height H from each of the end surfaces 16a and 16a and circumferential width W. The projecting portion of the rib 15 is alternatively shaped such that the projecting height H from each of the end surfaces 16a and 16a is equal to or more than 1 mm.

When the rising end surface 15a receives force along the cylinder axis from the circumferential edge portion of the through hole Pw1 in the wall body Pw, the projecting portion of the rib 15 can slide with the end surface 15a kept in contact with the circumferential edge portion. The grommet 1 can thus continuously achieve suppression in contact area between each of the ribs 15 and the circumferential edge portion of the through hole Pw1 in the wall body Pw and can keep small frictional resistance therebetween when the fitting body 10 is assembled to the through hole Pw1 in the wall body Pw, for reduction in insertion force to the through hole Pw1 in the wall body Pw.

The first support portion 16A and the second support portion 16B exemplified herein project from the outer circumferential wall surface 12a to be high enough to prevent inclining deformation of the rib 15 in the circumferential direction. The first support portion 16A and the second support portion 16B are herein shaped similarly to each other. The projecting portion of the rib 15 exemplified herein may have deformation like shear deformation in the circumferential direction within the elastic region or compressive deformation within the elastic region when the rising end surface 15a receives force along the cylinder axis. When the rising end surface 15a receives force along the cylinder axis from the circumferential edge portion of the through hole Pw1 in the wall body Pw, the projecting portion of the rib 15 exemplified herein can slide with the end surface 15a kept in contact with the circumferential edge portion while having shear deformation or compressive deformation caused by the circumferential edge portion. The grommet 1 exemplified herein can thus achieve reduction in insertion force to the through hole Pw1 in the wall body Pw when the fitting body 10 is assembled to the through hole Pw1 in the wall body Pw.

In the rib 15 integrally provided with the first support portion 16A and the second support portion 16B, the side adjacent to the outer circumferential wall surface 12a of the rib 15, the first support portion 16A, and the second support portion 16B are collectively provided as a rigidity improving portion projecting from the outer circumferential wall surface 12a. The first cylindrical portion 12A has suppressed bending deformation within the elastic region or reduction in bending deformation at a position of the rigidity improving portion. The first cylindrical portion 12A accordingly has a plurality of rigidity improving portions disposed at equal intervals in the circumferential direction, for further rigidity improvement at the radially outer portion provided with the ribs 15 and the like. With the plurality of rigidity improving portions provided at the first cylindrical portion 12A, the fitting body 10 having been assembled to the through hole Pw1 in the wall body Pw can achieve more effective suppression of elastic deformation or further reduction in elastic deformation at the radially outer portion of the first cylindrical portion 12A. In the grommet 1, the circumferential edge portion of the through hole Pw1 in the wall body Pw can thus be easily kept fitted in the fitting groove 13 and the fitting body 10 can keep the assembled state to the through hole Pw1.

As described above, the grommet 1 and the wire harness WH according to the present embodiment can reduce insertion force to the through hole Pw1 in the wall body Pw as well as can keep the assembled state to the through hole Pw1.

The fitting body 10 in the grommet 1 includes a locked portion 17 that is disposed radially inside the ribs 15, rises from the outer circumferential wall surface 12a for each of the ribs 15, and is configured to be locked to an outer circumferential surface 20a of the first cylinder 20A when the first cylinder 20A is shifted relatively to the fitting body 10 along the cylinder axis toward the second cylinder 20B, for suppression of elastic deformation of the first cylindrical portion 12A or reduction in elastic deformation (FIG. 1 to FIG. 5). The locked portion 17 rotates along arrow A indicated in FIG. 4 to be locked to the outer circumferential surface 20a of the first cylinder 20A when the first cylinder 20A is shifted relatively to the fitting body 10 along the cylinder axis toward the second cylinder 20B. The locked portion 17 exemplified herein has a cubic shape projecting from the outer circumferential wall surface 12a and provided integrally with the rib 15, the first support portion 16A, and the second support portion 16B.

In the grommet 1 and the wire harness WH according to the present embodiment, the locked portions 17 improve rigidity at a radially inner portion of the first cylindrical portion 12A, for suppression of elastic deformation or reduction in elastic deformation at the radially inner portion of the first cylindrical portion 12A in the fitting body 10 having been assembled to the through hole Pw1 in the wall body Pw. In the grommet 1 and the wire harness WH, due to also effective suppression of elastic deformation at the radially inner portion of the first cylindrical portion 12A and the like, the circumferential edge portion of the through hole Pw1 in the wall body Pw can be kept fitted in the fitting groove 13 and the fitting body 10 can keep the assembled state to the through hole Pw1.

In the grommet and the wire harness according to the present embodiment, the ribs are each formed to have circumferential width (in other words, small width) enabling elastic deformation in the circumferential direction due to force applied along the cylinder axis to a rising end surface. In the grommet and the wire harness, the plurality of ribs having such small width enables reduction in contact area with the circumferential edge portion of the through hole in the wall body, reduction in frictional resistance, and reduction in insertion force to the through hole in the wall body. In the grommet and the wire harness according to the present embodiment, the fitting body includes a first cylindrical portion provided with the ribs having the small width at the rising end surface as described above, and the first cylindrical portion is provided with the first support portion and the second support portion supporting the sides, adjacent to an outer circumferential wall surface, of the first side wall and the second side wall of the rib, to prevent elastic deformation in the circumferential direction. The first cylindrical portion accordingly has suppressed bending deformation within the elastic region or reduction in bending deformation at positions of the first support portion and the second support portion, for rigidity improvement at a radially outer portion. The fitting body having been assembled to the through hole in the wall body is thus suppressed from elastic deformation or reduced in elastic deformation at the radially outer portion of the first cylindrical portion. In the grommet and the wire harness, the fitting groove is provided at the radially outer portion of the fitting body. Due to effective suppression of elastic deformation at the radially outer portion of the first cylindrical portion or the like, the circumferential edge portion of the through hole in the wall body can be kept fitted in the fitting groove and the fitting body can keep the assembled state to the through hole. As described above, the grommet and the wire harness according to the present invention can reduce insertion force to the through hole in the wall body as well as can keep the assembled state to the through hole.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
   a fitting body causing a circumferential edge portion of a through hole having a circular shape and provided in a wall body to be fitted into a fitting groove having an annular shape and provided in an outer wall, and causing a harness body routed along a hole axis of the through hole in a space in the outer wall to be extracted from the space through a first draw-out aperture having a circular shape and disposed at a first axial end and a second draw-out aperture having a circular shape and disposed at a second axial end;

a first cylinder having a cylinder axis coaxial with an axis of the fitting body, projecting outward from a circumferential edge portion of the first draw-out aperture, and causing the harness body in the space to be extracted through inside of the first cylinder; and a second cylinder having a cylinder axis coaxial with the axis of the fitting body, projecting outward from a circumferential edge portion of the second draw-out aperture, and causing the harness body in the space to be extracted through inside of the second cylinder, wherein the fitting body includes a cylindrical portion having an outer circumferential wall surface joined to the fitting groove at a position closer to the first cylinder than the fitting groove in the outer wall, and gradually reduced in diameter as being away coaxially from the fitting groove, a plurality of ribs rising from the outer circumferential wall surface of the cylindrical portion and disposed on the outer circumferential wall surface at equal intervals in a circumferential direction, and each extending on the outer circumferential wall surface at least from a position equal in diameter to the circumferential edge portion of the through hole to a radially outer end, a first support portion provided for each of the ribs and supporting a side, adjacent to the outer circumferential wall surface, of a first side wall of the rib on a first side in the circumferential direction, and a second support portion provided for each of the ribs and supporting a side, adjacent to the outer circumferential wall surface, of a second side wall of the rib on a second side in the circumferential direction, the rib is shaped to enable elastic deformation in the circumferential direction, and the first support portion and the second support portion project from the outer circumferential wall surface to be high enough to suppress elastic deformation of the rib in the circumferential direction toward the outer circumferential wall surface.

2. The grommet according to claim 1, wherein
the rib is shaped to enable inclining deformation in the circumferential direction within an elastic region, and
the first support portion and the second support portion project from the outer circumferential wall surface to be high enough to suppress at least inclining deformation of the rib in the circumferential direction toward the outer circumferential wall surface.

3. The grommet according to claim 1, wherein
the first support portion projects to the first side in the circumferential direction from the side, adjacent to the outer circumferential wall surface, of the first side wall, and
the second support portion projects to the second side in the circumferential direction from the side, adjacent to the outer circumferential wall surface, of the second side wall.

4. The grommet according to claim 2, wherein
the first support portion projects to the first side in the circumferential direction from the side, adjacent to the outer circumferential wall surface, of the first side wall, and
the second support portion projects to the second side in the circumferential direction from the side, adjacent to the outer circumferential wall surface, of the second side wall.

5. The grommet according to claim 1, wherein
the fitting body includes a locked portion that is disposed radially inside the ribs, rises from the outer circumferential wall surface for each of the ribs, is configured to be locked to an outer circumferential surface of the first cylinder when the first cylinder is shifted relatively to the fitting body along the cylinder axis toward the second cylinder, to suppress elastic deformation of the cylindrical portion or reduce elastic deformation.

6. The grommet according to claim 2, wherein
the fitting body includes a locked portion that is disposed radially inside the ribs, rises from the outer circumferential wall surface for each of the ribs, is configured to be locked to an outer circumferential surface of the first cylinder when the first cylinder is shifted relatively to the fitting body along the cylinder axis toward the second cylinder, to suppress elastic deformation of the cylindrical portion or reduce elastic deformation.

7. The grommet according to claim 3, wherein
the fitting body includes a locked portion that is disposed radially inside the ribs, rises from the outer circumferential wall surface for each of the ribs, is configured to be locked to an outer circumferential surface of the first cylinder when the first cylinder is shifted relatively to the fitting body along the cylinder axis toward the second cylinder, to suppress elastic deformation of the cylindrical portion or reduce elastic deformation.

8. The grommet according to claim 4, wherein
the fitting body includes a locked portion that is disposed radially inside the ribs, rises from the outer circumferential wall surface for each of the ribs, is configured to be locked to an outer circumferential surface of the first cylinder when the first cylinder is shifted relatively to the fitting body along the cylinder axis toward the second cylinder, to suppress elastic deformation of the cylindrical portion or reduce elastic deformation.

9. A wire harness comprising:
a harness body; and
a grommet protecting the harness body, wherein
the grommet including:
a fitting body causing a circumferential edge portion of a through hole having a circular shape and provided in a wall body to be fitted into a fitting groove having an annular shape and provided in an outer wall, and causing the harness body routed along a hole axis of the through hole in a space in the outer wall to be extracted from the space through a first draw-out aperture having a circular shape and disposed at a first axial end and a second draw-out aperture having a circular shape and disposed at a second axial end;
a first cylinder having a cylinder axis coaxial with an axis of the fitting body, projecting outward from a circumferential edge portion of the first draw-out aperture, and causing the harness body in the space to be extracted through inside of the first cylinder; and
a second cylinder having a cylinder axis coaxial with the axis of the fitting body, projecting outward from a circumferential edge portion of the second draw-out aperture, and causing the harness body in the space to be extracted through inside of the second cylinder, wherein
the fitting body includes a cylindrical portion having an outer circumferential wall surface joined to the fitting groove at a position closer to the first cylinder than the fitting groove in the outer wall, and gradually reduced in diameter as being away coaxially from the fitting groove, a plurality of ribs rising from the outer circumferential wall surface of the cylindrical portion and disposed on the outer circumferential wall surface at equal intervals in a circumferential direction, and each extending on the outer circumferential wall surface at least from a position equal in diameter to the circumferential edge portion of the through hole to a radially outer end, a first support portion provided for each of the ribs and supporting a side, adjacent to the outer circumferential wall surface, of a first side wall of the rib on a first side in the circumferential direction, and a second support portion provided for each of the ribs and supporting a side, adjacent to the outer circumferential wall surface, of a second side wall of the rib on a second side in the circumferential direction, the rib is shaped to enable elastic deformation in the circumferential direction, and the first support portion and the second support portion project from the outer circumferential wall surface to be high enough to suppress elastic deformation of the rib in the circumferential direction toward the outer circumferential wall surface.

* * * * *